United States Patent [19]

Anderson et al.

[11] Patent Number: 4,707,750
[45] Date of Patent: Nov. 17, 1987

[54] AUTOMATIC SEQUENCER FOR A FLEXIBLE DISK LOADER/COPIER

[75] Inventors: Wayne H. Anderson, Costa Mesa; David E. Larson, Anaheim; Mark R. Reinhart, Bellflower, all of Calif.

[73] Assignee: Media Systems Technology, Inc., Irvine, Calif.

[21] Appl. No.: 703,345

[22] Filed: Feb. 20, 1985

[51] Int. Cl.$^4$ .................... G11B 15/04; G11B 5/06; G11B 15/18

[52] U.S. Cl. ..................... 360/60; 360/15; 360/71

[58] Field of Search .............. 360/60, 69, 15, 71

[56] References Cited

U.S. PATENT DOCUMENTS

| | | | |
|---|---|---|---|
| 3,824,563 | 7/1974 | Lutz | 360/60 |
| 4,375,655 | 3/1983 | Korth et al. | 360/15 |
| 4,494,156 | 1/1985 | Kadison et al. | 360/48 |
| 4,554,599 | 11/1985 | Shiozaki | 360/69 |

Primary Examiner—Vincent P. Canney
Attorney, Agent, or Firm—Knobbe, Martens, Olson & Bear

[57] ABSTRACT

An automatic flexible disk loader/copier apparatus includes a disk drive for reading data from and writing data onto flexible disks; an automatic mechanical loader for feeding disks from an input hopper into the disk drive and for discharging disks from the disk drive; a selectable format flexible disk controller which is dynamically reprogrammable to vary the format of the data written to the disks; and a computer which responds to the presence of write-protect indicators on the disks in the disk drive to load format, data and control information from the disks and which responds to the absence of write-protection indicators on the disks in the disk drive to write format and data to the disks.

14 Claims, 6 Drawing Figures

AUTOMATIC SEQUENCER FOR A FLEXIBLE DISK LOADER/COPIER

BACKGROUND OF THE INVENTION

This invention relates generally to reproduction of magnetically stored data, and pertains more particularly to automatic disk copying machines and computer disk drive controllers having selectable formats for copying magnetic computer disks.

CROSS-REFERENCE TO RELATED PATENT AND APPLICATION

The disclosure of copending U.S. patent application Ser. No. 377,196, entitled "Automatic Floppy Disk Drive Loader," filed on May 11, 1982; copending U.S. patent appliction Ser. No. 554,988 entitled "Automatic Micro-Floppy Disk Drive Loader," filed on Nov. 25, 1983; and U.S. Pat. No. 4,494,156, issued on Jan. 15, 1985, all of which are assigned to the same assignee as the invention described herein, are incorporated herein by reference.

BACKGROUND OF THE INVENTION

Flexible computer disks are digital data storage devices which may be used in conjunction with computers to store large amounts of information. Each flexible disk includes a circular plastic sheet which is impregnated with magnetic particles. The plastic disk is mounted inside a square jacket which encloses the disk, but which allows the circular plastic disk to rotate inside the jacket. Typically, the flexible disks are available in three sizes, inch, 5¼ inch, and 3½ inch. The flexible disks are mounted in computer disk drives which rotate the plastic disks within the jackets and which have magnetic recording/reproducing heads for writing data to or reading data from the flexible disks.

The digital data is stored on the flexible disk in a plurality of circumferential tracks or cylinders. Each track or cylinder is concentric with the axis of rotation of the flexible disk. The format of a flexible disk defines the method of data addressing and encoding. For example, a track or cylinder of a flexible disk is typically divided into a number of sectors, each of which is independently addressable, and each of which comprises a finite amount of digital data. The format of the digital addressing and data on computer disks varies from manufacturer to manufacturer and often varies among the products produced by the same manufacturer. Thus, there is no universally accepted disk format currently in use. Furthermore, as a method of preventing computer programs from being copied, a number of manufacturers produce flexible disks having addressing and data formats which vary from sector to sector and from track to track.

Typically, a computer system is designed to be able to read from or write to only one or, at most, a limited number of formats. Thus, the computer system will not be able to read data from or write data onto a flexible disk mounted in the computer's associated disk drive which does not have a format which matches the particular format of the associated disk controller of the computer. Although this typically does not present problem to the typtical computer user, it is a significant problem to high-volume publishers of software distributed on flexible disks. Typically, the publisher receives software from a number of sources intended to be used on machines having incompatible formats. Thus, in order to have large source and distribution bases, a publisher must be able to accommodate each of the large number of formats currently in use. Although this could be accomplished by having a separate machine for copying each of the formats, this is not an economically feasible method of operating a software copying business. Thus, there is a need for a selectable format computer disk copier machine which can by dynamically reprogrammed to accommodate disks having widely varying formats. One such machine is described in U.S. Pat. No. 4,494,156, referenced above.

Although it is possible to manually insert flexible disks into a disk drive, initiate routines in a disk copier to format the disk within the disk drive, copy data to the disk and verify that the copy is correct, and then remove the disk from the disk drive, this is a wholly impractical method of producing a large number of copies of software on flexible disks. The amount of time required for operator intervention in transferring the disks and initiating the formatting, copying and verifying processes can exceed the time during which the controller is formatting the disk, and copying and verifying the data. Thu, a number of automatic loaders have developed in the art for transferring flexible disks from an input stack of flexible disks to the disk drive and from the disk drive to one or more output stacks. Since the mechanical operation of a loader can insert disks into and remove disks from the disk drive in four or five seconds as compared with a substantially larger amount of time required for an operator to perform the same task, and since the mechanical device substantially removes the opportunity for human error in performing the operation, the volume of disks produced by such a machine greatly exceeds that producible by a human operator. Furthermore, one human operator can oversee the operations of a number of such devices by loading the input stacks, initiating the copying process and then keeping the input stacks full and removing disks from the output stacks. Copending U.S. patent application Ser. No. 377,196 and copending U.S. application Ser. No. 554,988 disclose automatic loader apparatuses for 5¼ inch and 3½ inch flexible disks, respectively.

The combination of a selectable format computer disk copier machine (U.S. Pat. No. 4,494,156) and a loader, such as described in the copending patent application Ser. Nos. 377,196 and 554,988, greatly enhance the ability of a software publisher to generate a large volume of computer disks having variable formats. However, as described in the copending applications and the issued patent, the devices have been used primarily to copy data to disks having the same format. The format of the data and the data to be written to the blank disks has been provided to the controller from either a host computer or from a second disk drive into which a format master disk and a data master disk have been sequentially inserted by the operator. Thus, in the prior devices, the automatic loader and copier combination has been used solely to copy a single format and data pattern at a time onto a stack of flexible disks. When it became necessary to change the data and/or the format, the operator must insert new master disks into the second flexible disk drive or the host computer must issue a sequence of commands to load new data and/or a new format into the disk controller. Either requirement effectively precludes a fully automatic stand-alone system. It has been necessary to interrupt the loading process to reformat the controller and/or load new data into the controller. Thus, a need exists for a loader apparatus having a selectable format flexible disk controller which can independently process a stack of flexible disks having varying formats or data information without requiring intervention from an operator or from an external control source.

SUMMARY OF THE INVENTION

The automatic disk copier of this invention allows the copying of digital data onto computer disk so that a large number of copies having variable formats can be made automatically. The disk copier has an automatic mechanical feeder which automatically feeds flexible disks through a disk drive for transferring data to and from the disks. Unlike prior apparatuses, the apparatus of the present invention utilizes a single flexible disk drive for initializing the disk controller, for transferring the data to be copied to the disk controller, and for copying data onto blank disks. Control master disks with format and other control information and data master disks with data to be copied recorded on them are included in the input stack of flexible disks. Each master disk is designated as such by the presence of an active write-protection indicator. The disk drive senses the presence of the write-protection indicator on a flexible disk in the drive and generates a write-protect signal which is conducted to the flexible disk controller and to an associated computer. A software algorithm within the computer recognizes the presence of the active write-protect signal and inhibits copying to the disk in the disk drive. The algorithm further causes the disk drive to seek to a designated track of the flexible disk and read the data recorded on the designated track. The data thus read is analyzed by the computer to determine whether the characteristics of the data on the disk identify it as a control master disk.

If the computer determines that the flexible disk is a format master disk, it initiates commands to the flexible disk controller to load the format control information from the disk in the disk drive and configure a format definition program in the controller memory with data representative of the format or formats to be written onto subsequent flexible disks. The operation of the selectable format computer disk controller with respect to the reconfiguration of the format definition program memory is described more fully in U.S. Pat. No. 4,494,156. Other master disks, such as an alignment master disk and an end master disk cause other noncopying functions to occur.

The selectable format computer disk controller of the present invention further includes a data storage memory for storing the data to be written onto the blank flexible disks. When the computer detects the write-protect signal and analyzed the data read from the designated track, and does not find a data pattern corresponding to a control master, the controller assumes that the write-protected disk in the disk drive is a data master disk. The controller initiates commands to the disk drive to transfer the data from the disk in the disk drive to a data storage memory. The flexible disk controller is then fully configured to transfer the data stored in the data storage memory to the subsequent blank flexible disk. In the preferred embodiment the data storage memory is a fixed (or hard) disk drive.

When the disk drive is loaded with a flexible disk which is not write-protected, the flexible disk controller transfers the format and data information from the format definition program memory and from the data storage memory to the disk in the disk drive. It then verifies that the format and data have been properly recorded on the disk. Thereafter, the disk is removed from the disk drive and deposited in an accept or reject bin, depending upon whether the verification routine confirmed that the disk was properly copied. The loader then transfers the next disk from the input stack of disks to the disk drive and the copying and verifying routines are repeated.

If a write-protect signal is again detected on a disk in the disk drive, the copying and verifying process is again interrupted and the flexible disk controller is reconfigured with new data or a new format and new data, depending upon the characteristic of the write-protected disk. Thus, the disks which determine the configuration of the format definition program memory and the data storage memory are included in the stack of flexible disks to be copied. The input stack can be sequentially filled with a plurality of disks requiring different formats and/or data without physically interrupting the operations of the automatic loader and copier to change either the format or the data. The number of blank disks included between the write-protected disks determines the number of copies made of each master data disk. Thus, an operator having to run a number of copies of disks from various sources can place the master disks and the required number of blank disks for each of the format and data configurations into the input hopper and leave the machine to automatically copy the disks and change formats without interruption. So long as the operator keeps disks in the input hopper, the automatic loader and copier will operate continuously irrespective of the number of changes in the formats and the data to be copied.

The apparatus of the present invention can also be operated with a write-protected alignment disk which can be periodically inserted into the input stack of flexible disks. When the presence of the write-protect indicator is detected by the controller and signaled to the computer, and when the designated track is read, the computer can determine that the write-protected disk is an alignment disk. The computer then initiates a routine to verify that the recording/reproducing head of the disk drive properly aligns itself with respect to the tracks of the alignment disk. Thus, the integrity of the copying process can be periodically monitored without interrupting the automatic loading and copying process.

The automatic loader can be configured to handle up to 100 flexible disks in the input stack. Since it can take anywhere from 20 to 180 seconds to copy and verify each disk, the automatic loader and copier can run for more than one hour without having to be refilled by the operator. Thus, an operator can easily handle a large number of disk copier machines, e.g., in excess of twenty machines. Since one machine can generate in excess of 500 copies per eight hour day, one operator is thus capable of producing in excess of 12,000 disk copies per eight hour day. Thus, the improvements of the present invention greatly enhance the output of a typical copying operation.

DETAILED DESCRIPTION OF THE DRAWINGS

Figure 1:
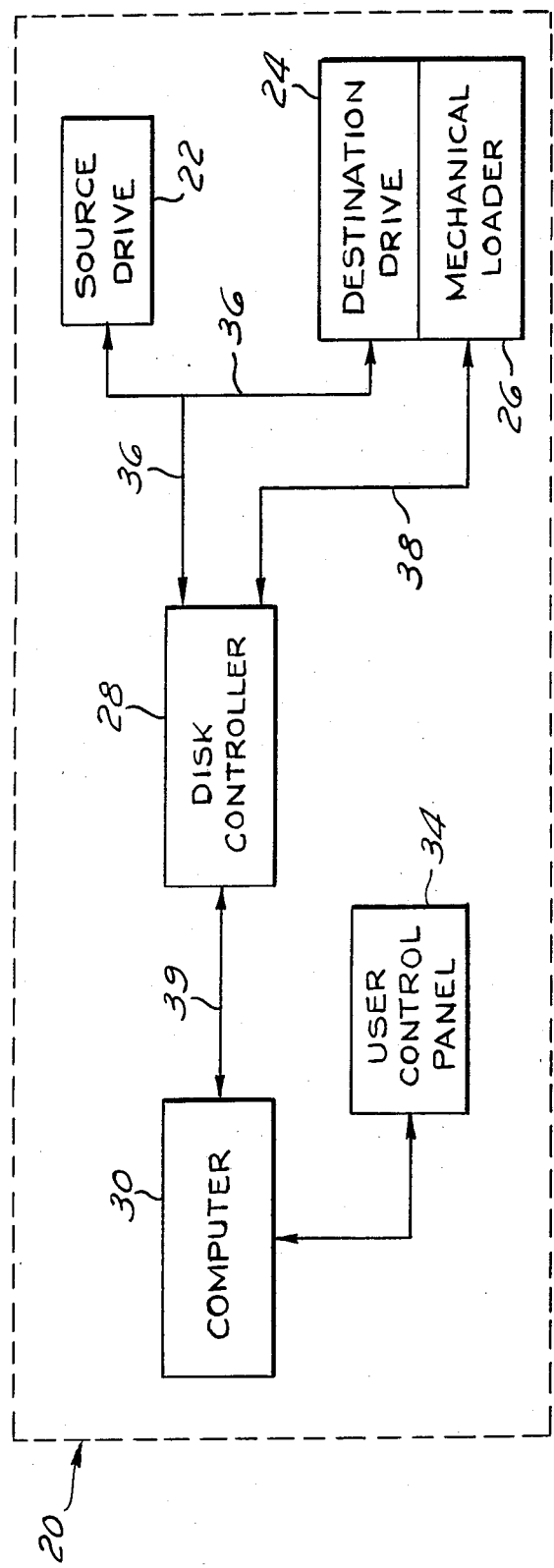
FIG. 1 illustrates a block diagram of a typical prior art automatic loader and copier machine such as was described in U.S. Pat. No. 4,494,156.

FIG. 1 is a block diagram of an automatic disk loader/copier 20 such as was disclosed in U.S. Pat. No. 4,494,156. The loader/copier 20 comprises a source disk drive 22, a destination disk drive 24, a mechanical loader 26, a disk controller 28, a computer 30, and a user control panel 34. In a preferred embodiment of the illustrated device, the components comprising the loader/copier are housed in one enclosure (not shown) and can be used as a stand-alone device.

The source drive 22 and the destination drive 24 are electrically interconnected with the disk controller 28 by data, control, and status lines, illustrated as a single bus 36. The disk controller 28 generates signals to initiate various disk drive functions, such as seeking to a particular track, reading data from the track, writing data to the track, and formatting the track. The operations of disk drives in performing these and other functions are well known to the art.

The mechanical loader 26 is electrically interconnected with the disk controller 28 by control and status lines illustrated as a bus 38. The destination disk drive 24 is mechanically a part of the loader 26. The disk controller 28 generates command signals to the loader 26 which initiate sequences within the loader 26 to transfer a flexible disk from the bottom of a stack of flexible disks (not shown) and insert the flexible disk into the destination drive 24. After data is copied onto the disk in the destination drive 24, and the data is checked to determine whether it has been properly copied, the disk controller 28 generates signals to the mechanical loader 26 to remove the disk from the disk drive and transfer it either to an accept bin (not shown) or a reject bin (not shown), depending upon the outcome of the verification check. The same sequences of operation are then repeated for the current bottommost flexible disk in the input stack of flexible disks. The operation of a mechanical loader for 5¼" flexible disks is disclosed in copending U.S. application Ser. No. 377,196. The operation of a mechanical loader for 3½" flexible disks is disclosed in copending U.S. application Ser. No. 554,988.

The source drive 22 is generally used as a read-only disk drive. That is, data is transferred from a disk in the disk drive 22 to the disk controller 28 or to the destination drive 24. The data thus transferred is typically of three major categories. The disk in the source drive can be used to provide data to the disk controller 28 which is transferred to the computer 30 via address, data, control and status lines illustrated as a bus 39. The data so transferred can be used to reprogram the host computer 30. In the disk copying mode, the disk in the source drive 22 typically can be characterized as either format definition master disk or a data master disk.

As set forth in full detail in U.S. Pat. No. 4,494,156, if the disk in the source drive 22 is a format master disk, the operator of the disk loader/copier 20 can enter manual commands via the user panel 34 which instruct the computer 30 to initiate a sequence of instructions to reprogram the disk controller 28. The computer 30 will generate control and data signals on the bus 39 to cause the disk controller 28 to read the contents of the format definition master disk in the source drive 22 and reconfigure the data in a format definition program memory internal to the disk controller 28. It is necessary that the operator of the loader/copier 20 have the proper disk in the source drive 22 when the commands are initiated.

After the format definition program memory in the disk controller 28 has been programmed for a selected format, the format definition master disk is removed from the source drive 22 and replaced with a data master disk which has the data to be copied onto blank disks in the destination drive 24. The operator then uses the control panel 34 to instruct the computer 30 to initiate a sequence of commands to the disk controller 28 to copy the data from the disk in the source drive 22 to the disk in the destination drive 24. Typically, the disk in the destination drive 24 has already been initialized with a format compatible with the format programmed into the disk controller 28. After copying the data onto the disk in the destination drive 24, the computer 30 typically generates commands to cause the disk controller 28 to verify the data copied onto the disk in the destination drive 24 with the data from the disk in the source drive 22. Typically, the comparison of the copied data with the source data is performed within the computer 30. If the computer 30 determines that the data has been copied properly, it issues commands to the disk controller 28 to command the mechanical loader 26 to remove the disk from the destination drive 24 and transfer it to the accept bin (not shown). If the data does not verify correctly, the computer 30 will generate commands to the disk controller 28 to cause the mechanical loader 26 to remove the disk from the destination drive 24 and transfer it to the reject bin (not shown).

The above-described device can make multiple copies of the data on the disk in the source drive 22 by automatically feeding disks from the bottom of a supply stack of disks in the mechanical loader 26 to the destination drive 24. So long as the operator continues to keep blank disks in the supply stack of the mechanical loader 26, the loader/copier 20 will continue to make copies. However, it should be apparent to one skilled in the art that each copy must be identical to the master data disk in the source drive 22. If the operator desires to change the data, the operation must be interrupted, and a new data master disk inserted into the source drive 22 before resuming the operation. If the new data master disk does not have the same format as the previous data, the disk controller 28 must be reprogrammed by inserting a new format definition disk into the source drive 22 and instructing the computer 30 to generate commands to the disk controller 28 to reformat the data in the format definition program memory in the controller 28. Then a new data master must be inserted into the source drive 22.

One can readily see that the operation of the loader/copier 20 illustrated in FIG. 1 and disclosed in U.S. Pat. No. 4,494,156 is a very advantageous improvement over the art when copying the same data in the same format to a large number of disks. However, if the copying task is to make a relatively small number of copies from each of a relatively large number of different master disks, the above-described loader/copier 20 can cause the task to become very labor intensive. In other words, the operator will have to spend a considerable amount of time changing the disks in the source drive 22 and instructing the computer 30 via the control panel 34. For example, if each disk can be copied and verified in ninety seconds, and only five copies are to be made from each master disk, the operator must be able to service the loader/copier 20 every 7.5 minutes in order to keep the loader/copier 20 running. Furthermore, the amount of time required for the operator to swap the disks in and out of the source drive 22 and initiate commands on the control panel 34 becomes a significant portion of the time required to make the disk copies. Furthermore, the frequent operator intervention increases the probability of human error in making the copies. Therefore, a need has existed for a means to redefine the format and for changing the data to be copied without requiring operator intervention.

Figure 2:
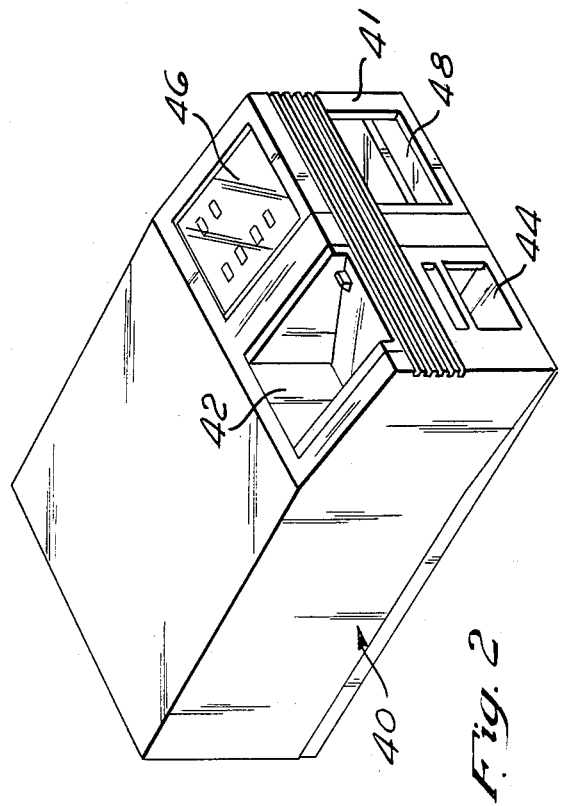
FIG. 2 illustrates a perspective view of the present invention.
Figure 3:
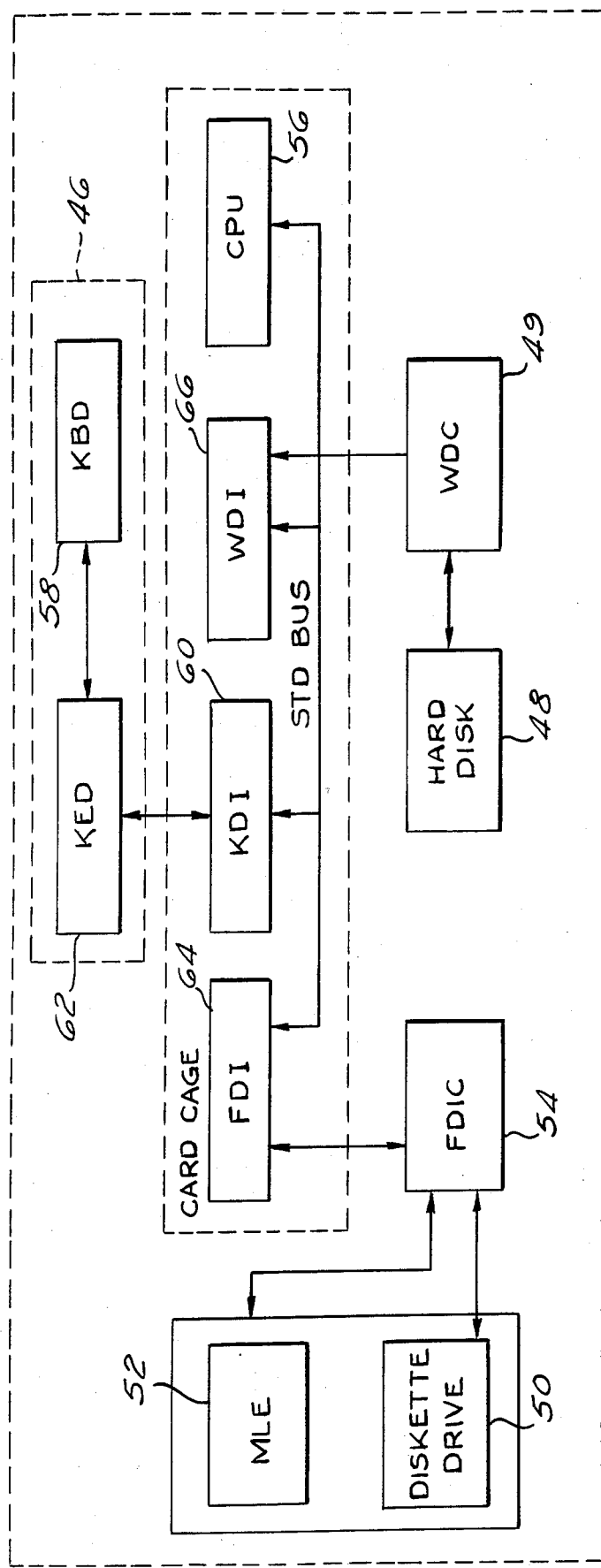
FIG. 3 illustrates a block diagram of the present invention.

The present invention provides a cost effective means for automatically redefining the data formats and automatically changing the master data to be copied without stopping the loader/copier and without requiring any operator intervention other than filling the input hopper and emptying the accept and reject bins. FIG. 2 illustrates a preferred embodiment of the loader/copier 40 of the present invention, and FIG. 3 illustrates a block diagram of a preferred embodiment of the loader/copier 40 of the present invention.

The present invention is housed in an enclosure 41 which is similar to the enclosure of the apparatus described in copending U.S. application Ser. No. 377,196. The enclosure 41 has an input hopper 42 which holds a stack of flexible disks. As illustrated, the input hopper 42 can hold approximately 50 flexible disks. However, the input hopper 42 can be extended to hold in excess of 100 flexible disks.

The enclosure 41 also has a tray 44 which provides access to the accept bins and the reject bins (not shown). A control panel 46 displays the status of the current operation and provides a means for the operator to initiate various functions of the loader/copier 40. The enclosure 41 also includes a data storage memory such as a fixed disk drive 48. (As is well-known in the art, a fixed disk drive has a non-removable recording media with a large storage capacity.) Although a fixed disk 48 is used in the preferred embodiment, semiconductor memory can be used. Preferably, the semiconductor memory includes circuitry to maintain the data stored therein when power is removed from the loader/copier 40.

The electronics which controls the present invention is enclosed in the enclosure 41. The block daigram shown in FIG. 3 illustrates the interrelationships between the components of the present invention. A diskette drive 50 is located in the enclosure 41 and is aligned with the bottom of the supply hopper 42 to receive the flexible disks transferred from the input stack of disks in the supply hopper 42. (The diskette drive 50 is not shown in FIG. 2.) The enclosure further includes loader electronics 52 which generates signals to the electromechanical mechanisms of the loader/copier 40 to move the lowermost flexible disk in the input hopper to the disk drive 50 and removes a disk from the disk drive 50 and transfer it to the accept or reject bins (not shown). The flexible disk controller 54 operates in the manner set forth above with respect to the invention of U.S. Pat. No. 4,494,156.

The present invention further includes a central processing unit (computer) 56 which receives commands from a membrane switch array 58 which is part of an operator's control panel 46 and which displays the status of current operations on a display panel 62 on the operator's control panel 46. The computer 56 communicates with the switch array 58 and the display 62 via a keyboard display interface 60.

The computer 56 also issues commands to and receives data from the flexible disk controller 54 via a flexible disk interface 64. The computer 56 transfers data to and from the fixed disk drive 48 via a fixed disk drive interface 66 and a fixed disk drive controller 49.

Figure 4:
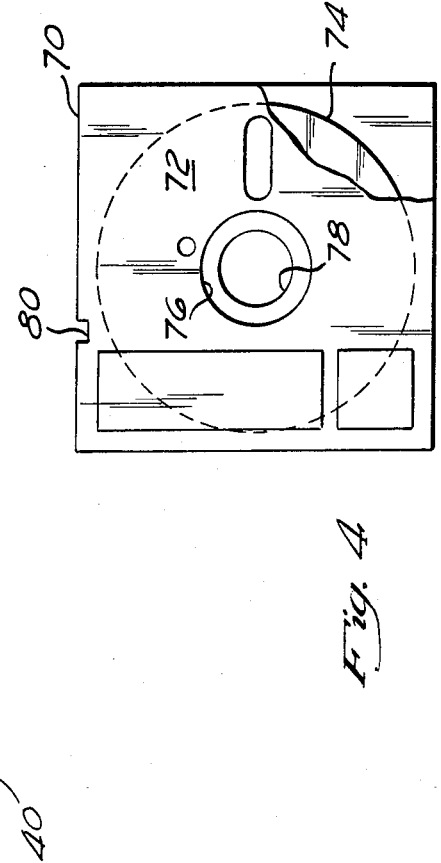
FIG. 4 is a plan view of a typical 5¼ inch flexible disk showing the write-protect notch.

The operations of the present invention are initiated by having the operator insert a stack of flexible disks in the input hopper 42 shown in FIG. 3. Unlike the previously described copiers, the present invention does not have a separate flexible disk drive for format definition master disks or for data master disks. Instead, the operator inserts a format definition disk and a data master disk into the input hopper 42 below the blank flexible disks to which the data is to be transferred. Since each of the flexible disks are physically identical, a means is provided for identifying those disks which supply data to the flexible disk controller 54 as opposed to those disks onto which data is to be written. A typical 5¼" flexible disk 70 is illustrated in FIG. 4. Basically, the flexible disk 70 comprises a square envelope 72 into which a circular flexible recording media 74 (shown with part of the envelope 72 cut away) has been inserted. The envelope 72 includes a circular opening 76 in the center which exposes a spindle hole 78 in the center of the flexible media 74. The envelope 72 also includes a notch 80. The notch 80 is located in an identical standard location on 5¼" flexible disks. The notch 80 works in conjunction with a phototransmitter/detector circuit or other sensing means in the flexible disk drive 50 to determine whether the flexible disk 70 is write-protected. If the notch 80 is present, light is transmitted from the phototransmitter to the photodetector in the disk drive 50. The disk drive 50 provides a signal to the flexible disk controller 54 which indicates whether the notch 80 is present. If the notch is present, the flexible disk controller 54 is able to write onto the flexible disk 70 in the disk drive 50. If the notch 80 is not present, light cannot be conducted from the phototransmitter to the photodetector and the flexible disk controller 54 cannot write data onto the flexible disk 70. This may occur either because the envelope 72 was constructed without a notch 80 or because the notch 80 has been covered with tape or other means. The use of write-protect notches for selectably preventing flexible disk controllers from writing data onto disks is well known in the art. In 3½" flexible disks, the write-protection control is accomplished by a movable flap in a manner well known to the art.

Unlike prior devices, the present invention makes use of the write-protection notch (or the flap) to identify disks which are not meant to have data written to them, but are instead meant to control the operations of the apparatus. For example, a format definition master disk or other control master disk will have the write-protection notch 80 covered with tape or it will be enclosed in an envelope 72 which does not have a write-protection notch 80. Similarly, a data master disk will be identified in like manner.

Figure 5:
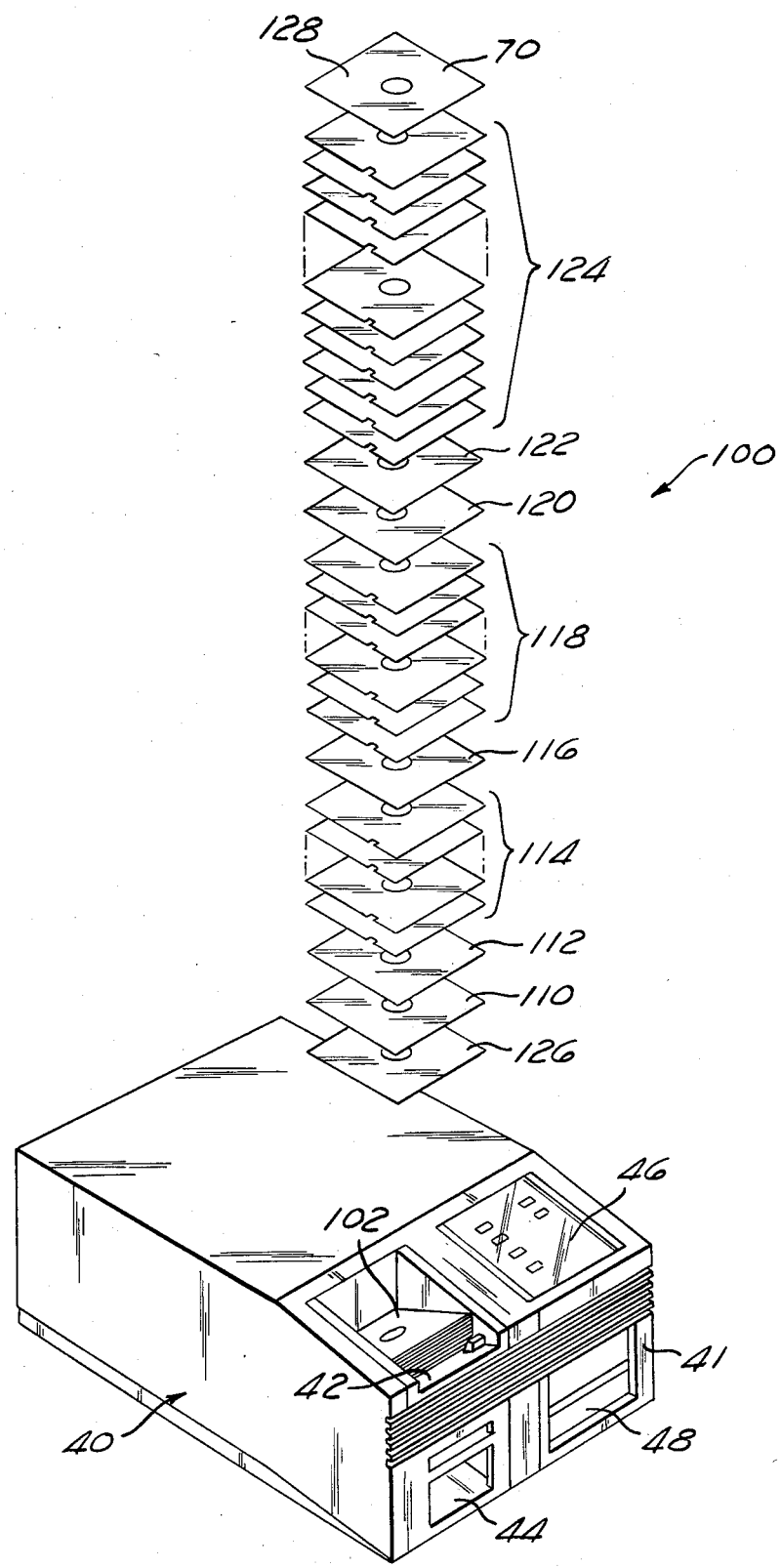
FIG. 5 is a perspective view of the present invention showing an exploded view of an exemplary job stream of flexible disks.

FIG. 5 illustrates the preferred embodiment of the present invention and, in partial exploded view, shows an exemplary stack 100 of flexible disks 70 to be added to a stack 102 of flexible disks 70 in the input hopper 42.

The stack 100 comprises a format definition master disk 110 followed by a data master disk 112 and a series of blank disks 114 onto which data is to be copied. The number of disks 114 is determined by the number of copies to be made from the data master disk 112. The blank disks 114 are followed by another data master disk 116 and then another series of blank disks 118. The blank disks 118 are then followed by a format definition master disk 120, a data master disk 122, and a series of blank disks 124. As illustrated, the blank disks 114, 118, 124 have the write-protect notch open to indicate that the disks are blank, whereas the format definition master disks 110, 120 and the data master disks 112, 116, 122 either have the write-protect notch closed or are enclosed in jackets without write-protect notches. For illustrative purposes, the stack 100 also includes two other special purpose disks, an alignment master disk 126 and an end master disk 128, whose functions will be explained below.

Figure 6:
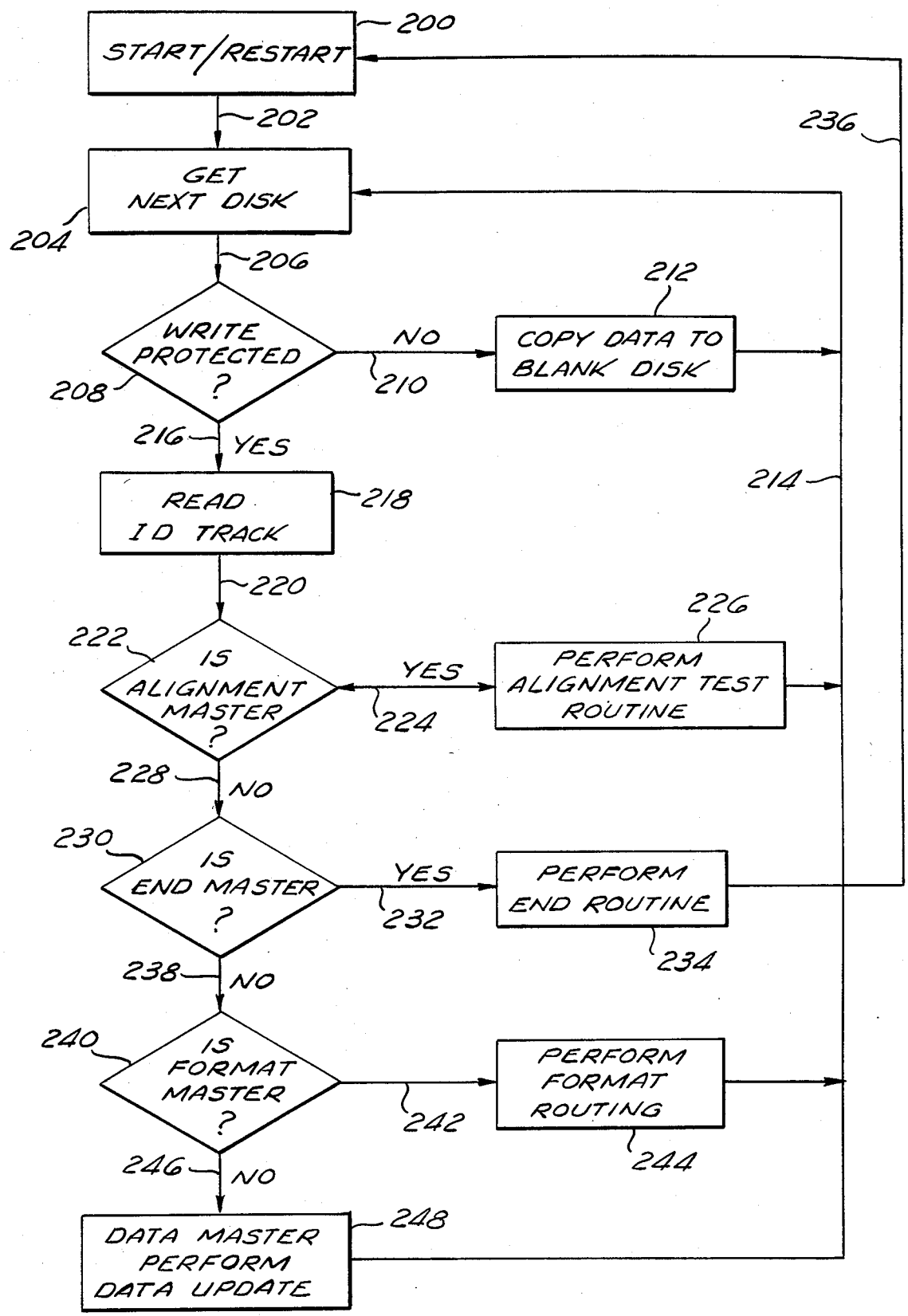
FIG. 6 is a flow chart illustrating the algorithm which determines the operation to be performed on each disk in the disk drive.

The function of the write-protect notches in the present invention can be understood by referring to a simplified flow chart shown in FIG. 6. The flow chart represents the software algorithms in the computer 50 which control the operations of the flexible disk controller 56 and the other elements shown in the block diagram of FIG. 3. The activity box 200 represents the initial operations of the apparatus when it is first started after turning the power on or restarting or resetting it after a temporary halt. When first powered on, or reset by the operator, program control data from a read only memory in a prom associated with the computer 56 (FIG. 3) causes the computer 56 to load system software from the fixed disk 48 or other data storage memory, and initialize the computer 56, the fixed disk interface 66, the keyboard display interface 60, the flexible disk interface 64, and the flexible disk controller 54 for proper operation. Since the fixed disk 48, or other nonvolatile data storage device will contain the format and data information last transferred from format and data master disks, the flexible disk controller 54 will be initially configured to resume copying with the previously used format and master data. Thereafter, program control is transferred via a path 202 to an activity box 204 which represents the algorithms which comprise the "get-next-disk" routine. In the activity box 204, the loader electronics 52 is activated to cause a flexible disk to be loaded from the bottom of the the stack of disks in the input hopper 42 (FIG. 3) and inserted into the disk drive 50. When the disk drive 50 indicates to the flexible disk controller 54 that the disk is loaded, program control is transferred via a path 206 to a decision block 208.

In the decision block 208, the computer 256 checks the status of the write-protect signal from the disk drive 50 to determine whether the disk currently loaded in the disk drive 50 is write-protected. If the disk is not write-protected, control is transferred via a path 210 to an activity block 212. The software algorithms associated with the activity block 212 cause data to be copied from the fixed disk 48 to the disk in the disk drive 50. In the preferred embodiment, the software algorithms are specifically configured to copy the format information and data information onto the blank disk in the disk drive 50 in one pass per track. Furthermore, the software algorithms then initiate a verification routine to verify that the format and data information has been properly written onto the disk. Control is then transferred via a path 214 to the "get-next-disk" activity block 204 where the disk is ejected, either to the accept bin or the reject bin, in accordance with the results of the verification routine. The next disk is then inserted into the disk drive 50, and control then passes to the decision block 208 via the path 206, as before.

If the write-protect signal is active when it is checked in the decision block 208, program control transfers from the decision block 208 via a path 216 to an activity block 218. The software algorithms associated with the activity block 218 read a specific track of the disk in the disk drive 50 and analyzes the data thus read to determine whether the disk is one of the master disks. In the preferred embodiment, track 25 of the disk is used for this purpose; however, other tracks can be used so long as the use is consistent from disk to disk. The track will be referred to hereinafter as the "identification track." After the data recorded on the identification track are transferred into the memory of the computer 56, program control is passed via a path 220 to a decision block 222. In the decision block 222, the associated software algorithm compares the data read from the identification track with the data expected on an alignment master disk. If the data are identical, control transfers via a path 224 to an activity block 226 where a disk alignment routine is performed. If the data does not match, control is transferred via a path 228 to a decision block 230 where the data are compared with the identification data for an end master disk. If the data are the same, control passes via a path 232 to an activity block 234 where the software performs an end routine. If the data are not the same as the data for an end master, control passes via a path 238 to a decision block 240, where the data are compared with the data for a format master disk. If the data are the same, control transfers via a path 242 to an activity block 244 which represents algorithms which change the format definition program memory of the flexible disk controller 56. Otherwise, control transfers via a path 246 to an activity block 248 where the software performs a routine which reads the data from the disk in the disk drive 50 and updates the master source data image stored on the fixed disk 48. This is done since it is presumed that if a write-protected disk does not have data on the identification track corresponding to one of the control master disks then it is a data master disk.

After performing either the alignment test routine in activity block 226, the format routine in activity 244, or the data update routine in activity block 248, control returns to the activity block 204 via a path 214.

The format routine is similar to the format routine described above in connection with U.S. Pat. No. 4,494,156. The format data on the format master disk is transferred to the flexible disk controller 54 to update the format definition program memory in the flexible disk controller 54. In the present invention, the format definition information is also stored on the hard disk 48 or other data storage device so that the format definition information is available to initialize the flexible disk controller 56 when the invention is powered-on or reset.

The alignment test routine is a means of automatically self-diagnosing the machine without interrupting operations for maintenance. Unlike normal data disks which have data written only on the specified track locations, an alignment disk is specially prepared by the manufacturer to have random noise information written between the data tracks. Thus, if the recording/reproducing head of the disk drive does not align itself on the center of the data tracks, the recording/reproducing head will detect the noise and may generate erroneous data, depending upon the extent of the misalignment. If erroneous data are detected, the computer 56 will cause the present invention to stop so that the disk drive 50 can be realigned or replaced with a properly aligned unit. Thus, by periodically inserting alignment disks in the job flow throughout the day, the present invention can be periodically tested for alignment without stopping the job flow unless an alignment error is found.

copies that can be made of protected disks. As set forth above, if one of the foregoing patterns is not found, each of the decision blocks 222, 232, 242 will not be satisfied and the software will presume that the write-protected disk is a data master disk which is to be copied onto the fixed disk 48.

The functions performed by the computer algorithm represented by the flow chart of FIG. 6 can be summarized as follows:

| WRITE-PROTECT | AM | FM | EM | DM | BM |
| --- | --- | --- | --- | --- | --- |
| OFF | COPY ONTO DISK | COPY ONTO DISK | COPY ONTO DISK | COPY ONTO DISK | COPY ONTO DISK |
| ON | TEST ALIGNMENT | LOAD FORMAT INTO CONTROLLER | WAIT FOR RESTART | UPDATE DATA IMAGE | UPDATE DATA IMAGE |

Thus, since the invention will halt operations when the alignment test fails, the possibility of generating a large number of disks with the data tracks improperly aligned is substantially reduced.

The end routine performs a special function of interrupting the flow of flexible disks and transferring control via a path 236 to the activity block 200 where the computer 56 will enter a software routine to wait until the operator reinitiates operations by pressing a start switch. In the preferred embodiment of the present invention, the computer 56 includes timers which indicate how long an operator allows the system to run with the supply hopper 42 empty or jammed. Thus, a manufacturer using the present invention can determine whether the operator is keeping the machine running at full efficiency by analyzing the timers. In order to stop the activity timers when there are no longer any jobs to be performed, an end master disk is provided which causes the machine to return to the idle state 200 until further jobs are available. Thus, the operator will not have the time during which the hopper 42 is empty because of lack of disks to be copied reflect against his or her efficiency.

In the preferred embodiment of the present invention, the identification track for the control master disks is track 25. Thus, the software algorithms associated with the activity 218 will cause the disk drive 50 to seek to track 25 and transfer the data found thereon through the flexible disk controller 54 to the computer 56. In the preferred embodiment, the data on the identification track has been specifically chosen to be an unlikely combination of data on a data master disk. For the alignment disk, the software associated with the activity block 218 expects to find the following data at the beginning of track 25:

Z7X3V@: ALIGNMENT DISK

For an end master disk, the software associated with the activity block 218 expects to find the following data:

Z7X3V@: END MASTER

For a format master disk, the software associated with the activity block 218 expects to find the following data:

Z7X3V@: FORMAT MASTER

If the format master is for a protected format, the following data will be found:

Z7X3V@: PROTECTED FMT

A protected format definition master is used for formats that cannot be readily copied on ordinary computer or disk copiers. Furthermore, other algorithms, not a part of the present invention, limit the number of where AM indicates the presence of an alignment master, FM indicates the presence of a format master, EM indicates the presence of an end master, DM indicates the presence of a data master, and BM indicates the presence of a blank disk in the flexible disk drive 50. As shown, a write-protected blank disk will be treated as a data master disk. However, when the flexible disk controller 54 attempts to transfer the data from the disk to the fixed disk 48, a blank disk will be rejected as invalid since it will not have a format compatible with a format currently programmed in the format definition program memory. Attached hereto as Appendix A is a Pascal program which is exemplary of portions of the software algorithms which implement the decision blocks shown in FIG. 6.

Returning again to FIG. 5, one can now understand the sequence of operations which will be performed when the stack 100 of flexible disks are loaded into the present invention. After the flexible disks in the stack 102 have passed through the invention, the disk 126, which was described as an alignment disk when FIG. 5 was first introduced, will be loaded into the disk drive 50 (not shown). Since the disk 126 is write-protected, the software will cause the identification track to be read and the data thus read will identify the disk as an alignment disk. The computer 56 (FIG. 3) will then enter into an algorithm associated with the activity block 212 of FIG. 6 which tests the alignment of the disk. If the alignment is proper, the disk 126 will be ejected from the disk drive 50 into the accept bin and the disk 110 will be loaded into the disk drive. If the alignment is not within acceptable tolerances, the software algorithms will cause the apparatus to halt and display an error message corresponding to an alignment test failure.

As described above, the disk 110 is a format definition master disk. Therefore, when the write-protect is detected, the identification track of the disk 110 is read and the format master identification are detected. The software algorithms associated with the activity block 244 are performed, and the format information from the disk 110 is then loaded into the format definition program memory of the flexible disk controller 54. Thereafter, the disk 110 is ejected into the accept bin, and the data master disk 112 is loaded into the disk drive.

The disk 112 is write-protected. Thus, the identification track of the disk 112 will be read. However, since the random data on the disk 112 is highly unlikely to have data conforming with one of the control master identifications, the software algorithms in the computer 56 will determine that the disk 112 is a data master. Therefore, the computer 56 will perform the algorithms which transfer the data on the disk 112 to the fixed disk 48. The data thus transferred will be the source data for any subsequent blank disk to be copied. The disk 112 will then be ejected into the accept bin, and the blank disks 114 will be sequentially loaded into the disk drive 50.

Since each of the blank disks 114 have the write-protect notches open, the software algorithms in the computer 56 will determine that they are blank disks onto which the data should be copied. Thus, the data previously stored on the fixed disk 48 will be transferred to and verified on each of the disks 114. After the last disk 114 has had the data copied onto it and verified, the disk 116 is loaded into the disk drive.

As set forth above, the disk 116 was described as a data master disk. The presence of the write-protect signal will be detected but the identification track will not have a data corresponding to one of the control master disks. Therefore, the computer 56 will perform a master data update algorithm and the data on the disk 116 will be transferred to the fixed disk 48. In this particular example, the data master disk 116 was not preceded by a format definition master disk. Therefore, the flexible disk controller 56 will not alter the format definition program memory. Thus, the data stored in the fixed disk 48 will be transferred to subsequent blank disks with the same format as the previous data. After the disk 116 is ejected from the disk drive and transferred to the accept bin, the blank disks 118 as sequentially fed to the disk and the data stored on the fixed disk 48 is transferred to the disks 118.

After the last disk 118 is transferred from the disk drive to the accept or reject bin, as appropriate, the format definition master disk 120 is inserted into the disk drive 50. The write-protect signal is detected and the identification track is read. When the computer 56 determines that the disk is a format definition master disk, the format on the disk 120 is transferred to the format definition program memory of the flexible disk controller 54. Thereafter, the disk 120 is ejected to the accept bin and the disk 122 is inserted into the disk drive. The presence of the write-protect signal and the absence of one of the specified data patterns on the identification track identifies the disk 122 as a data master disk. The data from the disk 122 is transferred to the fixed disk 48. After the disk 122 is ejected to the accept bin, the blank disks 124 are sequentially fed into the disk drive and the data from the fixed disk 48 is transferred to them. After the last disk 124 is ejected from the disk drive, the end disk 128 is fed into the disk drive. The computer 56 recognizes the write-protect signal and reads the identification track to determine that the disk is an end disk. The end disk 128 will be ejected from the disk drive to the accept bin and the machine halted until restarted by the operator.

In the preceding example, a series of three separate jobs having different data to be copied were run without operator intervention. This is referred to herein as "job streaming". Although illustrated with respect to three jobs, the number of jobs run without stopping the machine and without any operator intervention (other than loading the supply hopper 42 and emptying the accept and reject bins), can be expanded indefinitely. Thus, the present invention provides a cost-effective means of fully utilizing the capabilities of an automatic disk loader/copier.

Although described above with respect to 5¼" flexible disk, one skilled in the art will recognize that this invention also works for 3½" flexible disks with appropriate substitution of a loader designed to handle 3½" flexible disks, such as the loader disclosed in copending U.S. application Ser. No. 554,988.

The write-protect notch to distinguish the control and data master disks is advantageously used in the preferred embodiment because the hardware for detecting the presence or absence of the notch is readily available. Other identification means, such as magnetic or electrically conductive tabs, could also be advantageously used.

The apparatus of the present invention can also be used in a single job mode similar to prior art devices. In this mode, also referred to as the auto-initialize mode, the operator loads a format master disk, a data master disk, and a number of blank disks into the input hopper. The operator then sets up the system by pressing a LOAD FORMAT key, a LOAD DATA key, and one or more of FORMAT, COPY, and VERIFY keys, and enters the number of copies required. When the operator then activates the START key, the system will load the format definition program memory from the format master disk and the fixed disk drive from the data master disk, and will then automatically process the blank disks as described above. In this mode, the automatic loader/copier of the present invention will stop after the selected number of disks have been copied.

More specific detailed information regarding the operation and other features of the automatic loader/copier of the present invention can be found in "Series 5000/6000 5¼" Desktop Automatic Winchester Diskette Copier", product specification 100223-02, published by Media Systems Technology and available from Media Systems Technology, Inc., 16950 Armstrong Avenue, Irvine, Calif. 92714-4965; and from "Design Specification, Application Module Software," available from Media Systems Technology, Inc.

What is claimed is:

1. An apparatus for automatically transferring data to and from a plurality of flexible computer disks, comprising:

a disk drive for transferring data to and from a flexible disk in said disk drive, said disk drive including a sensor for detecting the presence of an indicator on said flexible disk, and generating an indicator signal responsive to the presence of said indicator; and a selectable format disk controller operatively connected to said disk drive, said controller also operatively connected to a data storage device, said controller responsive to the presence of said indicator signal from said disk drive to transfer format, data, and control information from said flexible disk in said disk drive to said data storage device, and responsive to the absence of said indicator signal to transfer format and data from said data storage device to said disk in said flexible disk drive.

2. The apparatus as defined in claim 1 wherein said indicator on each said flexible disk is a write-protect control indicator.

3. The apparatus as defined in claim 2 wherein said write-protect control indicator is a notch in the envelope of said flexible disk.

4. The apparatus as defined in claim 2 wherein said write-protect control indicator is a movable flap.

5. The apparatus as defined in claim 1 wherein said data storage device is a fixed disk drive.

6. The apparatus as defined in claim 1 further including a computer, electrically connected to said controller, said computer responsive to the presence of said indicator signal to execute an algorithm to cause said disk controller to read an identification track on said flexible disk, and to analyze said data on said identification track to determine whether said disk is a master disk which controls the operation of said controller and said computer.

7. The apparatus as defined in claim 1 further including a mechanical loader having an input hopper for holding a stack of said flexible disks and a feed mechanism for sequentially conveying one flexible disk from said stack and inserting said one flexible disk into said disk drive, and for conveying said one flexible disk from said disk drive to a discharge location.

8. A method of reproducing disks in an apparatus for automatically loading a flexible disk from a stack of flexible disks into a disk drive and for transferring format, data, and control information to and from said flexible disk, comprising the steps of:
   sensing whether said flexible disk currently in said disk drive has a write-protect indicator thereon and selecting from one of the following steps in accordance with whether said indicator is present to determine whether data is to be transferred to said flexible disk:
   (1) automatically transferring information from said flexible disk in said disk drive to said apparatus when said write-protect indicator is present and automatically performing one of a set of functions based upon the characteristics of a predetermined portion of said transferred data; and
   (2) automatically transferring information from said apparatus to said flexible disk in said disk drive when said write-protect indicator is not present.

9. A method of reproducing disks in an apparatus for automatically loading a flexible disk from a stack of flexible disks into a disk drive and for transferring format, data, and control information to and from said flexible disk, comprising the steps of:
   sensing whether said flexible disk in said disk drive has a write protect indicator;
   transferring information from said flexible disk in said disk drive to said apparatus if said write protect indicator is present and performing one of a set of following functions based upon the characteristics of a predetermined portion of said transfer data, said set of functions including:
   a format definition program memory update function which transfers the information from said flexible disk in said disk drive to a format definition program in said apparatus; and
   a data image update function which transfers information from said flexible in said disk drive to a data storage memory in said apparatus.

10. The method as defined in claim 9 wherein said set of functions further includes an alignment test function to test the alignment of electromagnetic recording/reproducing heads in said disk drive.

11. The method as defined in claim 9 wherein said set of functions further includes an end function to halt the operation of said apparatus.

12. The method as defined in claim 8 wherein said predetermined portion of said transferred data is located on a predetermined data track of said flexible disk.

13. The method of claim 8, wherein the information transferred from said apparatus to said flexible disk when said write-protect indicator is not present includes information previously transferred from a write-protected flexible disk in said disk drive to said apparatus.

14. A method for automatically reproducing flexible computer disks utilizing an automatic loading apparatus having a disk drive, said method comprising the steps of:
   arranging a plurality of stacked flexible disks in an input portion of said automatic loading apparatus, said stacked flexible disks including master disks having data, format or control information and including blank disks;
   transferring said plurality of stacked flexible disks from said input portion of said apparatus to said disk drive, one disk at a time;
   sensing said one disk in said disk drive to determine whether it is a master disk from which information is to be transferred or a blank disk to which data is to be transferred; and
   performing a selected one of the following predetermined steps:
   (1) transferring information from said flexible disk to said apparatus if said disk is determined to be a master disk, and performing a selected operation in accordance with the contents of said information; and
   (2) transferring data to said flexible disk from said apparatus if said disk is determined to be a blank disk.

* * * * *